US008013720B2

(12) United States Patent
Oelrich et al.

(10) Patent No.: US 8,013,720 B2

(45) **Date of Patent: *Sep. 6, 2011**

(54) SIGNAL APPARATUS FOR FACILITATING SAFE BACKUP OF VEHICLES

(75) Inventors: Christopher L. Oelrich, Highland, CA (US); Curtis John Oelrich, Yucaipa, CA (US)

(73) Assignee: Reverse Control, Inc., Highland, CA (US)

(*) Notice: Subject to any disclaimer, the term of this patent is extended or adjusted under 35 U.S.C. 154(b) by 265 days.

This patent is subject to a terminal disclaimer.

(21) Appl. No.: 12/263,162

(22) Filed: Oct. 31, 2008

(65) Prior Publication Data

US 2009/0115630 A1 May 7, 2009

US 2010/0271235 A2 Oct. 28, 2010

Related U.S. Application Data

(60) Provisional application No. 60/985,070, filed on Nov. 2, 2007.

(51) Int. Cl.

*B60Q 1/00* (2006.01)

*G08G 1/00* (2006.01)

*G08B 21/00* (2006.01)

(52) U.S. Cl. ..... 340/435; 340/901; 340/902; 340/686.5; 340/686.6; 340/692; 340/426.17; 340/691.6

(58) Field of Classification Search .................. 340/435, 340/901, 902, 686.5

See application file for complete search history.

(56) References Cited

U.S. PATENT DOCUMENTS

| | | | | |
|---|---|---|---|---|
| 3,944,972 | A | 3/1976 | Chandler | |
| 4,236,594 | A | 12/1980 | Ramsperger | |
| 4,785,282 | A * | 11/1988 | Martell et al. | 340/323 R |
| 4,843,367 | A | 6/1989 | Saito | |
| 5,028,920 | A | 7/1991 | Dombrowski | |
| 5,132,665 | A | 7/1992 | Hutchisson et al. | |
| 5,208,586 | A | 5/1993 | Friberg et al. | |
| RE34,773 | E | 11/1994 | Dombrowski | |
| 5,746,284 | A | 5/1998 | Johnson | |
| 5,780,723 | A | 7/1998 | Koo | |
| 5,945,907 | A | 8/1999 | Yaron et al. | |
| 6,025,778 | A | 2/2000 | Dietz et al. | |

(Continued)

FOREIGN PATENT DOCUMENTS

JP 60071350 A2 4/1985

OTHER PUBLICATIONS

U.S. Appl. No. 11/409,767, filed Apr. 24, 2006, Oelrich.

(Continued)

*Primary Examiner* — Donnie Crosland

(74) *Attorney, Agent, or Firm* — Knobbe Martens Olson & Bear, LLP

(57) ABSTRACT

Systems and methods which allow a spotter external to a vehicle to provide signals to a driver of the vehicle in order to facilitate safe backup operations of the vehicle are disclosed. A wireless transmitter, in wireless communication with a receiver positioned within the vehicle, is operated by the spotter. An indicator, also in communication with the receiver, is configured to provide a plurality of audible and/or visible signals perceivable by the driver in response to a wireless signal received by the receiver from the transmitter. The audible and/or visible signals may comprise selected patterned tones and lights which inform the driver whether they should proceed to backup the vehicle or stop the vehicle.

16 Claims, 10 Drawing Sheets

U.S. PATENT DOCUMENTS

| | | | |
|---|---|---|---|
| 6,163,253 | A | 12/2000 | Yaron et al. |
| 6,268,803 | B1 | 7/2001 | Gunderson et al. |
| 6,696,983 | B2 | 2/2004 | Tang et al. |
| 6,707,391 | B1 | 3/2004 | Monroe |
| 6,819,231 | B2 | 11/2004 | Berberich et al. |
| 6,873,250 | B2 | 3/2005 | Viana et al. |
| 6,950,019 | B2 | 9/2005 | Bellone et al. |
| 7,148,794 | B2 | 12/2006 | Stigall |
| 7,463,137 | B2 | 12/2008 | Wishart et al. |
| 7,567,167 | B2 | 7/2009 | Oelrich et al. |
| 2002/0005780 | A1 | 1/2002 | Ehrlich et al. |
| 2002/0145522 | A1 | 10/2002 | Pembroke |
| 2002/0154007 | A1 | 10/2002 | Yang |
| 2007/0080584 | A1 | 4/2007 | Li |
| 2007/0182820 | A1 | 8/2007 | Wang |
| 2008/0258932 | A1 | 10/2008 | Oelrich et al. |
| 2009/0115630 | A1 | 5/2009 | Oelrich et al. |

OTHER PUBLICATIONS

U.S. Appl. No. 12/144,449, filed Jun. 23, 2008, Oelrich.

* cited by examiner

SIGNAL APPARATUS FOR FACILITATING SAFE BACKUP OF VEHICLES

CROSS-REFERENCE TO RELATED APPLICATIONS

This application claims the benefit of priority under 35 U.S.C. 119(e) of U.S. Provisional Application No. 60/985,070 filed on Nov. 2, 2007, entitled "SIGNAL APPARATUS FOR FACILITATING SAFE BACKUP OF LARGE VEHICLES," the entirety of which is incorporated herein by reference.

BACKGROUND OF THE INVENTION

1. Field of the Invention

Embodiments of the present disclosure relate generally to safety systems for use in facilitating the backup of large vehicles and, in particular, to wireless transmission systems which may be utilized by a spotter external to the vehicle in order to signal go and stop signals to an operator of the vehicle.

2. Description of the Related Art

Large vehicles of all shapes and sizes, such as fire engines, recreational vehicles, and construction vehicles, routinely deliver goods and services in large numbers each day. In the course of such activities, it is often necessary to backup such vehicles. For example, in the case of delivery trucks and fire engines, such vehicles backup numerous times in the course of a normal day to deliver cargo and maneuver into strategically desirable locations.

Backing up such large vehicles is more difficult and dangerous than standard passenger vehicles and trucks, however. Unlike passenger vehicles, many large commercial and service vehicles possess trailers or high storage boxes that obstruct the rearward view of the vehicle driver through a back window of the vehicle. As a result, drivers of large vehicles such as these must rely on side mounted mirrors to provide rearward visibility, rather than the mounted rear view mirror utilized in passenger vehicles. These side mounted mirrors are inherently limited in the view they provide, owing to rearward obstructions such as trailers, creating "blind spots."

In order to alleviate some of the difficulty and danger of backing up such vehicles to a desired position, a spotter may be positioned outside the vehicle. The spotter is generally positioned at the rear of the vehicle so as to monitor changing conditions within the incipient backup path of the vehicle. Should the vehicle need to stop, due to an obstruction or other hazard in the path of the vehicle, the spotter communicates a signal to the driver to stop.

The signal to stop has been traditionally accomplished by a number of mechanisms. In one example, the spotter makes hand signals at a location which can be visualized by the driver in one of the side mount mirrors. In other examples, the spotter may perform any combination of shouting a stop signal, whistling, and waving red flags and/or blinking flashlights.

These methods are effective only to the extent that the driver can see the spotter in one of the mirrors, or hear over the noise of the engine and surrounding conditions, however. Performing backup operations under adverse conditions such as darkness, inclement weather such as heavy rain, fog, shadows, and conditions of high glare from the sun, can severely hamper the driver's ability to see and/or hear a signal to stop from a spotter. Moreover, as the spotter walks behind the backing vehicle to monitor the position of the rear of the vehicle, the spotter routinely moves in and out of the driver's field of view within the mirrors (out of and into the blind spot). Thus, some signals provided by the spotter may not be within the view of the driver. This inability to receive clear signals from the spotter can critically delay the driver's perception of an emergency signal to stop, raising the risk that the vehicle will backup into a position where it may injure the spotter or damage property.

SUMMARY

In one embodiment, a system for signaling a driver of a vehicle to start and stop reverse motion of the vehicle comprises a transmitter positioned outside of the vehicle and configured to transmit a first wireless signal in response to activation of the transmitter, the transmitter being configured to cease transmission of the first wireless signal upon deactivation of the transmitter, a wireless receiver configured to detect the first wireless signal, and one or more indicators positioned proximate the driver of the vehicle and in communication with the wireless receiver, wherein the one or more indicators are configured to provide a first set of human perceivable indicators in response to the wireless receiver detecting the first wireless signal, wherein the first set of human perceivable indicators comprises two or more tones emitted from a speaker, the two or more tones being separated by a predetermined period where another tone or no tone is emitted from the speaker, the first series of human perceivable indicators indicating to the driver that the vehicle may proceed with a reverse motion movement, wherein the one or more indicators are further configured to provide a second set of human perceivable indicators, different than the first set, in response to the wireless receiver ceasing to receive the first wireless signal, the second set of human perceivable indicators indicating to the driver that the vehicle should not proceed with the reverse motion movement.

In one embodiment, a vehicle safety kit comprises a handheld wireless transmitter configured to transmit a first wireless signal only while a button of the wireless transmitter is depressed, and a vehicle module comprising a wireless receiver and one or more indicators, the vehicle module configured for installation in a vehicle such that the one or more indicators are proximate a driver of the vehicle in order to convey one or more of visual and audible signals provided by the indicators to the driver, wherein the wireless receiver is configured to receive the first wireless signal and to initiate the one or more indicators to emit a first signal while the first wireless signal is received.

In one embodiment, a method of providing backup instructions to a driver of a vehicle comprises electronically determining whether a wireless receiver positioned on or in the vehicle receives a first wireless signal transmitted from a wireless transmitter positioned outside of the vehicle, and in response to receiving the first wireless signal, providing instructions to one or more indicators that are positioned proximate a driver of the vehicle to provide a first set of signals representative of a command to backup the vehicle, in response to not receiving the first wireless signal, providing instructions to one or more indicators to provide a second set of signals representative of a command to not backup the vehicle.

DETAILED DESCRIPTION OF CERTAIN PREFERRED EMBODIMENTS

Embodiments of the present disclosure provide systems and methods which allow a spotter external to a vehicle to provide signals to a driver of the vehicle in order to facilitate safe backup operations of the vehicle. In one embodiment, the system comprises a wireless transmitter operated by the spotter that is in wireless communication with a receiver positioned within (or otherwise attached to) the vehicle. In further embodiments, an indicator is in communication with the receiver and is configured to provide a plurality of sets of audible and/or visible signals perceivable by the vehicle driver in response to a wireless signal from the transmitter received by the receiver. For example, the sets of audible and/or visible signals may comprise selected patterned tones and lights which inform the driver whether they should proceed to backup the vehicle or stop the vehicle.

In one embodiment, the spotter may activate the transmitter to broadcast at least one wireless signal that, when received by the receiver, causes the receiver to change the audible and/or visible signals provided by the indicator in order to specify a go condition. Subsequent deactivation of the transmitter, such as may be caused by releasing of a button or trigger on the transmitter by the spotter, may cause the transmitter to cease transmitting the wireless signal. When the cessation of the wireless signal is sensed by the receiver, the receiver may provide instructions to the indicator indicating that the audible and/or visible signals provided by the indicator specify a stop condition.

In an alternative embodiment, the spotter may activate the transmitter to broadcast at least one first wireless signal which, when received by the receiver, will change the audible and/or visible signals provided by the indicator in order to specify the go condition. Subsequent deactivation of the transmitter may cause the transmitter to broadcast at least one second wireless signal that, when received by the receiver, may cause the indicator to change the audible and/or visible signals provided by the indicator in order to specify the stop condition.

Advantageously, these system configurations cause the indicator to indicate a stop condition to the vehicle driver not only when the spotter deliberately deactivates the transmitter but also when the spotter becomes incapacitated or the wireless transmitter malfunctions, enhancing the safety of the spotter when using the system. These and other objects and advantages of the present disclosure are discussed in greater detail below.

Figure 1:
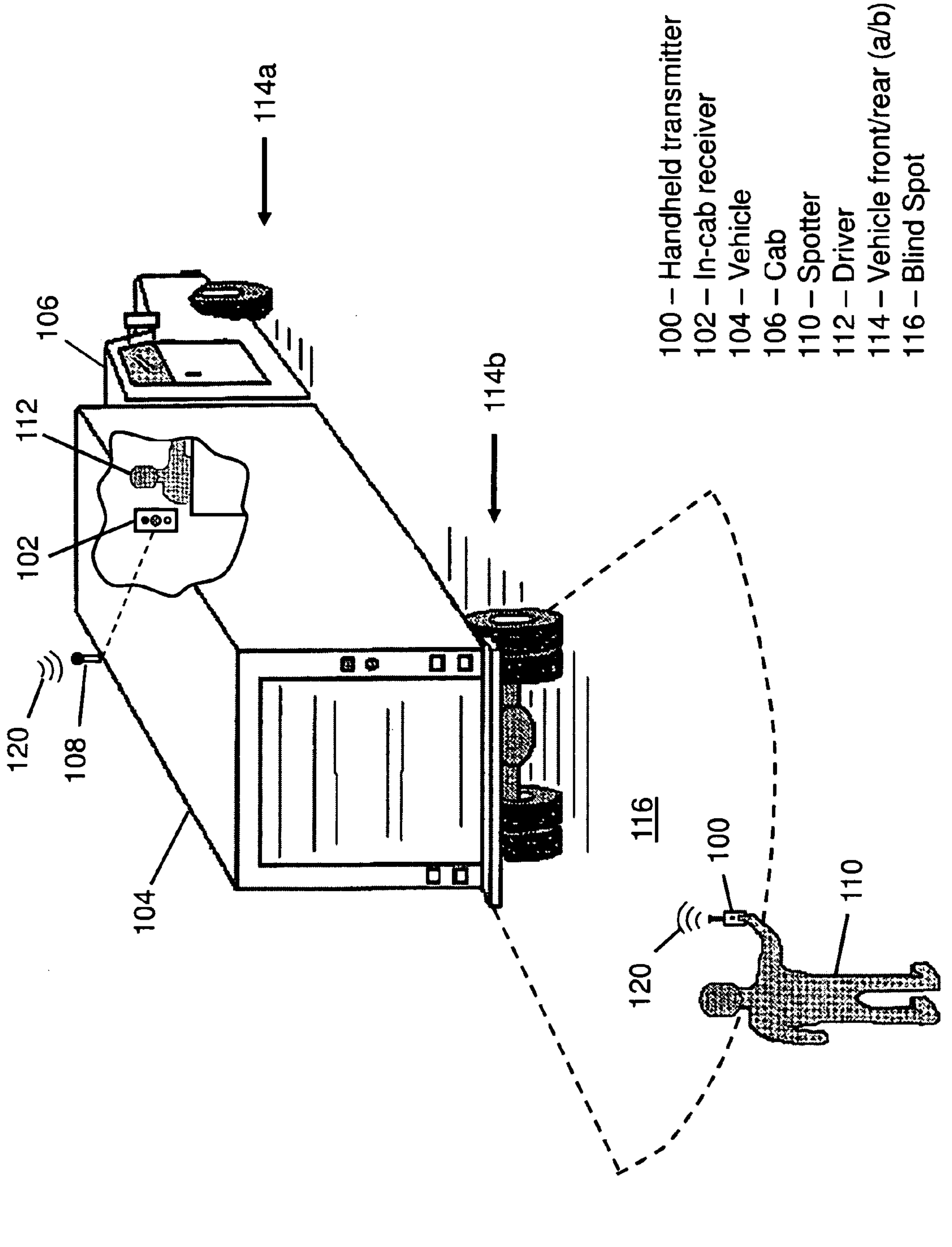
FIG. 1 is a schematic drawing of one embodiment of the backup safety system of the present disclosure, illustrating the use of a wireless transmitter by a spotter to provide signals to a receiver located within a vehicle.

FIG. 1 is a schematic drawing of one embodiment of the backup safety system. The system comprises a wireless transmitter 100 which is operated by a spotter 110. The transmitter 100 is configured to generate at least one wireless signal 120 when the transmitter is activated, such as by pressing a button, trigger, or other selector, of the transmitter 100. In general, the spotter 110 is positioned so as to be able to view of a blind spot 116 located behind the vehicle 104 that is obscured to a driver 112 located in the cab 106 at about a front portion 114*a* of the vehicle 104.

In one embodiment, the wireless transmitter 100 is configured for grasping by a single hand of the spotter 110. Furthermore, the wireless transmitter 100 may be configured for operation by the same hand of the spotter 110 that is holding the transmitter 100. Thus, in one embodiment the spotter 110 may both hold and control the transmitter 100 with a single hand. In one embodiment, the transmitter comprises a button, or other actuator, having only two positions, e.g., on and off positions, that may indicate whether or not it is safe for the driver 112 to reverse the vehicle. In this embodiment, the orientation of the wireless transmitter 100 with respect to an orientation of the vehicle 104 is not important, allowing the spotter 110 great freedom in his position and/or orientation near the vehicle 104. In this embodiment, the transmitter 100 does not indicate steering positions to the driver 112, but only provides a signal as to whether the driver 112 is clear to move the vehicle 104 in a reverse direction. In other embodiments, the transmitter 100 may include additional or fewer controls and/or functions.

The system further comprises one or more indicators 102 that are in communication with at least one receiver 108 configured to receive the at least one wireless signal 120. The indicators 102 may be mounted to the vehicle 104 so as to allow the audible and/or visible signals generated by the indicator 102 to be perceived by the vehicle driver 112. For example, the indicators 102 may be mounted within the cab 106 of the vehicle 104 or to one or more side mounted mirrors or rear-view mirrors of the vehicle 104. In other embodiments, the indicators 102 may be integral components of a vehicle, such as built into mirrors, displayed panels, or sun visors, for example.

In normal operation, the spotter 110 assesses the clearance of the vehicle 104 to back up, including but not limited to spaces within the blind spot 116, and initiates transmission of the wireless signal 120 from the wireless transmitter 100 by depressing a button or other selector of the wireless transmitter 100. This wireless signal 120, when received by the receiver 108, causes the receiver 108 to send a plurality of electrical signals to the indicator 102 that generate one or more audible and/or video indicators to the driver 112. In this manner, while the button is depressed on the wireless transmitter 100, the wireless signal 120 is transmitted to the receiver 108, and the receiver 108 causes the indicator 102 to provide the driver with one or more audiovisual signals indicating a "go" condition. Likewise, when the button is release on the wireless transmitter, such as when the vehicle has reached its final position or when the spotter becomes incapacitated, the wireless signal 120 ceases to be transmitted (or, in another embodiment, a "stop" signal is transmitted), the receiver 108 detects that the wireless signal 120 is no longer being received and, in response thereto, provides the driver with one or more audiovisual signals indicating a "stop" condition.

The wireless signal 120 may comprise any wireless signals. Embodiments may include, but are not limited to, radio frequency signals, infrared signals, and laser signals. Further examples may comprise "Bluetooth" wireless signals. In further embodiments, the transmitter 100 may be capable of providing wireless signals having frequencies ranging between about 900-928 MHz and a plurality of channels, such as about 100 channels, for example. In additional embodiments, the wireless signals may be received within an approximately 300 foot radius.

Figure 2C:
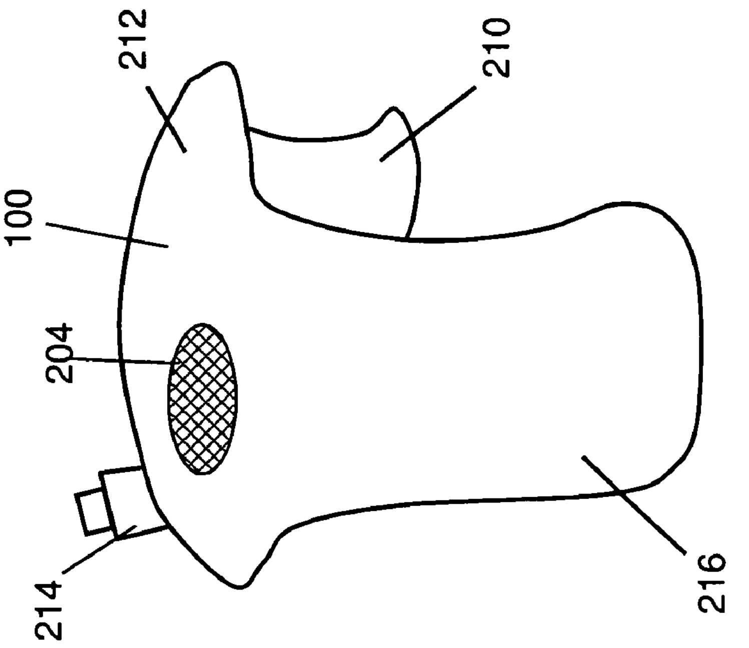
FIGS. 2A-2C are schematic illustrations of embodiments of the wireless transmitter of FIG. 1.
Figure 2B:
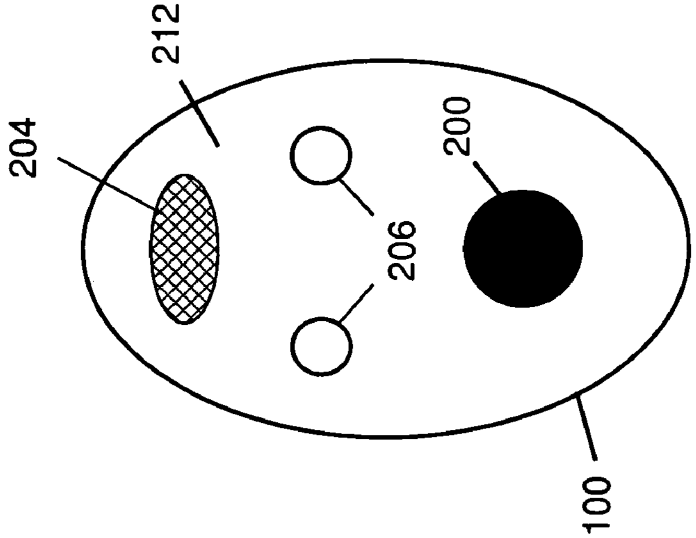
Figure 2A:
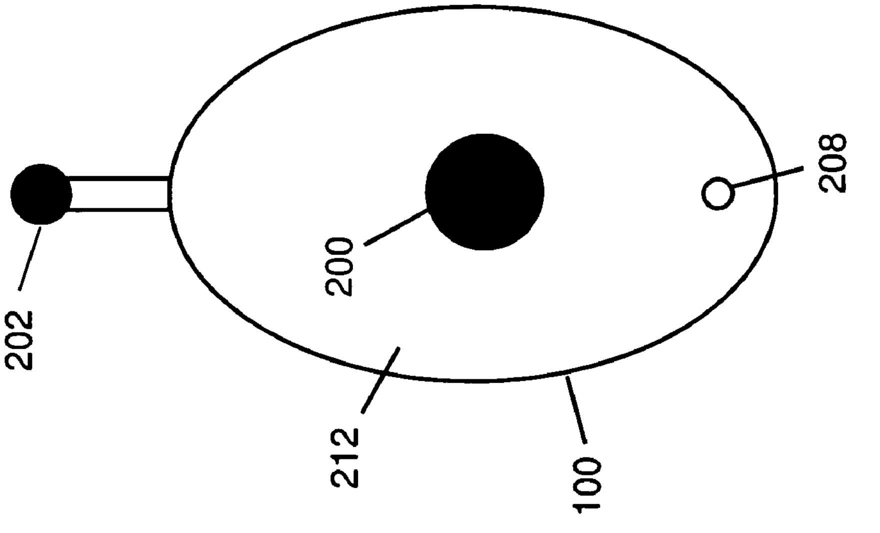

FIGS. 2A-2C illustrate several embodiments of the wireless transmitter 100, including wireless transmitters 100A, 100B, and 100C. Each of the transmitters 100 comprise a body 212 which is configured to be easily grasped and carried in the hand of a user, one or more buttons 200 mounted within and/or on the housing 212, and at least one transmitter antenna 202. As discussed herein, the transmitter 100 will be referred to as in an activated or actuated state when the button 200 (or some other actuator) is depressed (or actuated) and a deactivated or inactive state when the button 200 is not depressed. The transmitter antenna 202 may be configured such that at least a portion extends outside the housing 212, as illustrated in FIG. 2A or configured such that substantially the entire transmitter antenna 202 is contained within the housing 212, as illustrated in FIGS. 2B and 2C.

FIG. 2B illustrates an embodiment of the transmitter 100B comprising a plurality of indicator lights 206, 208 and a speaker 204. In one embodiment, the indicator lights 206, 208 and/or a speaker 204 may provide the spotter with one or more human-perceivable signals in response to the activation or deactivation of the transmitter. For example, the human-perceivable signals provided by the transmitter 100B may comprise at least one of the audible and/or visible signals corresponding to those to be generated by the receiver. In this manner, the spotter may be provided with feedback confirming that they are providing the driver with the desired audible and/or visible signals. In alternative embodiments, at least one of the indicator lights 206, 208 and speaker 204 may provide indication of a state of the system. For example, indicator light 208 may become lit to indicate a low battery condition of the transmitter 100B.

The wireless transmitters 100B and 100C may be further configured to provide two-way radio functionality. In such a configuration, electronics providing two-way radio functionality may be provided within the housing 212. In order for the spotter to utilize the radio, a radio button 214 and a microphone/speaker 204 are also provided to allow the spotter to send and receive radio communications. In one embodiment, the combined functionality of the safety system and two-way radio may reduce the need for the spotter to carry a separate two-way radio for other communications needs. In another embodiment, this combined functionality may provide the spotter a mechanism for communicating more specific verbal instructions to the driver of the vehicle using the transmitter 100B or 100C.

In one embodiment, the transmitter 100 may be configured so as to be used with a single hand. For example, in the embodiment of FIG. 2C, the button 200 comprises a trigger. So configured, the spotter may grasp a handle 216 with their fingers and clench the button 200 in order to activate the transmitter 100C. Alternatively, the buttons 200 may be replaced with a plunger, such as the radio button 214, that is positioned such that the spotter may depress the plunger with a thumb or finger of the same hand that holds the transmitter 100. Advantageously, these configurations free the off-hand of the spotter for other tasks, such as grasping and using other objects or making hand gestures.

In certain embodiments, the housing 212 may be constructed from materials or material systems which provide enhanced durability to the transmitter. For example, the housing 212 may be constructed of a metal. In further examples, the housing may comprise metals or plastics which are encased with a compliant, protective coating, such as rubber. Advantageously, such construction increases the likelihood that the transmitter 100 remains undamaged in the event of potentially damaging impacts, such as when dropped, stepped on, or placed in containers with other objects that shift into contact with the transmitter 100.

Figure 3B:
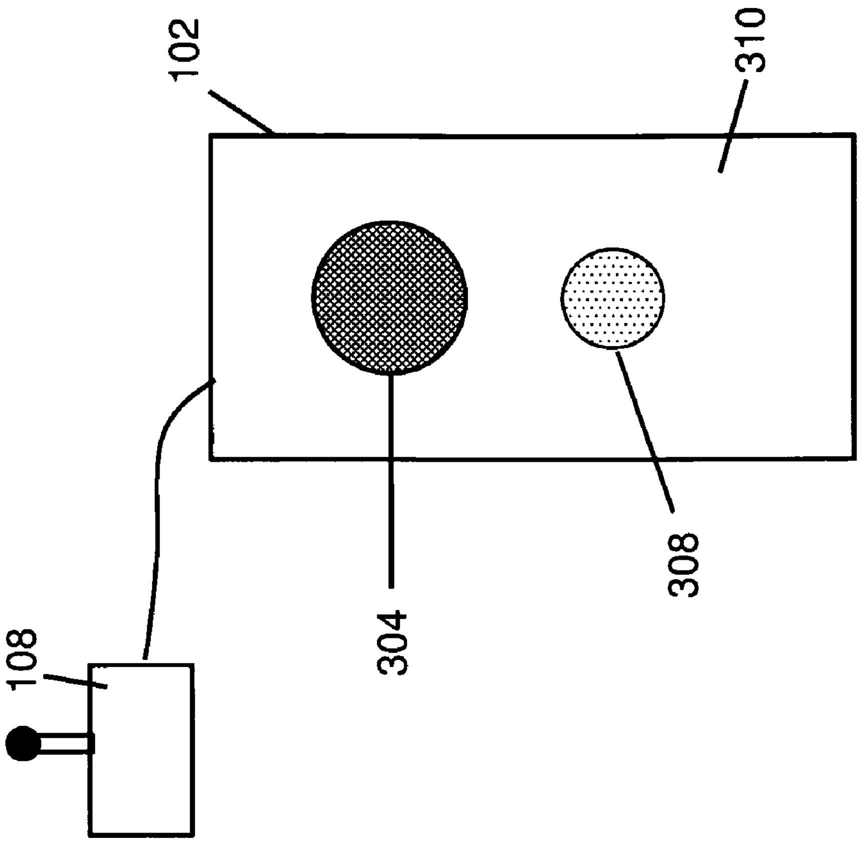
FIGS. 3A-3C are schematic illustrations of embodiments of the receiver of FIG. 1.
Figure 3A:
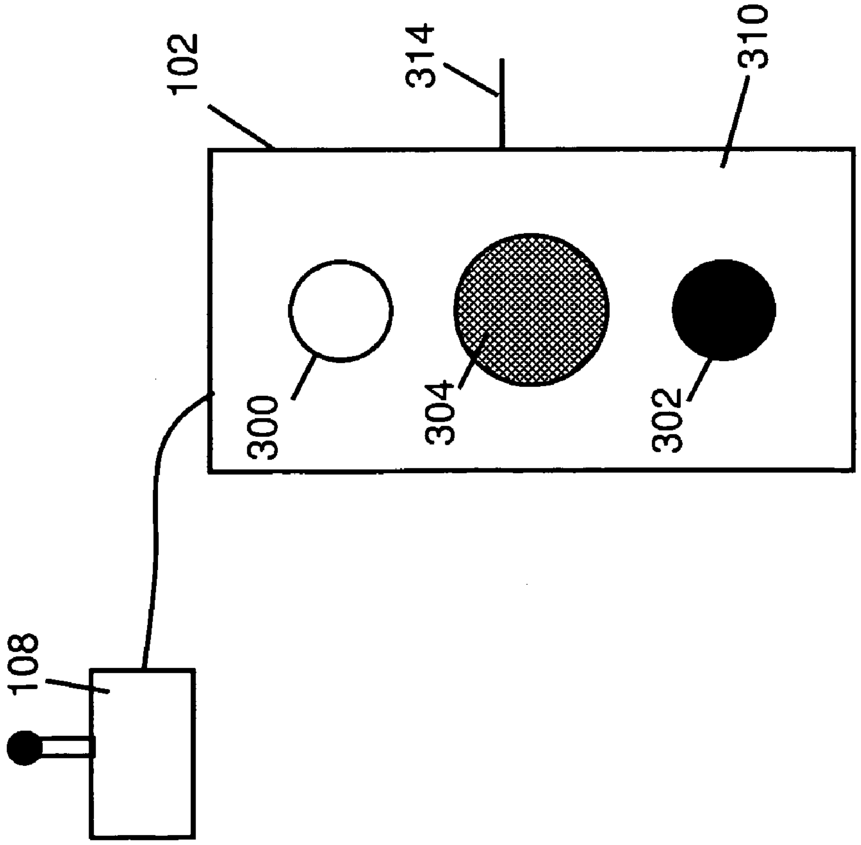
Figure 3C:
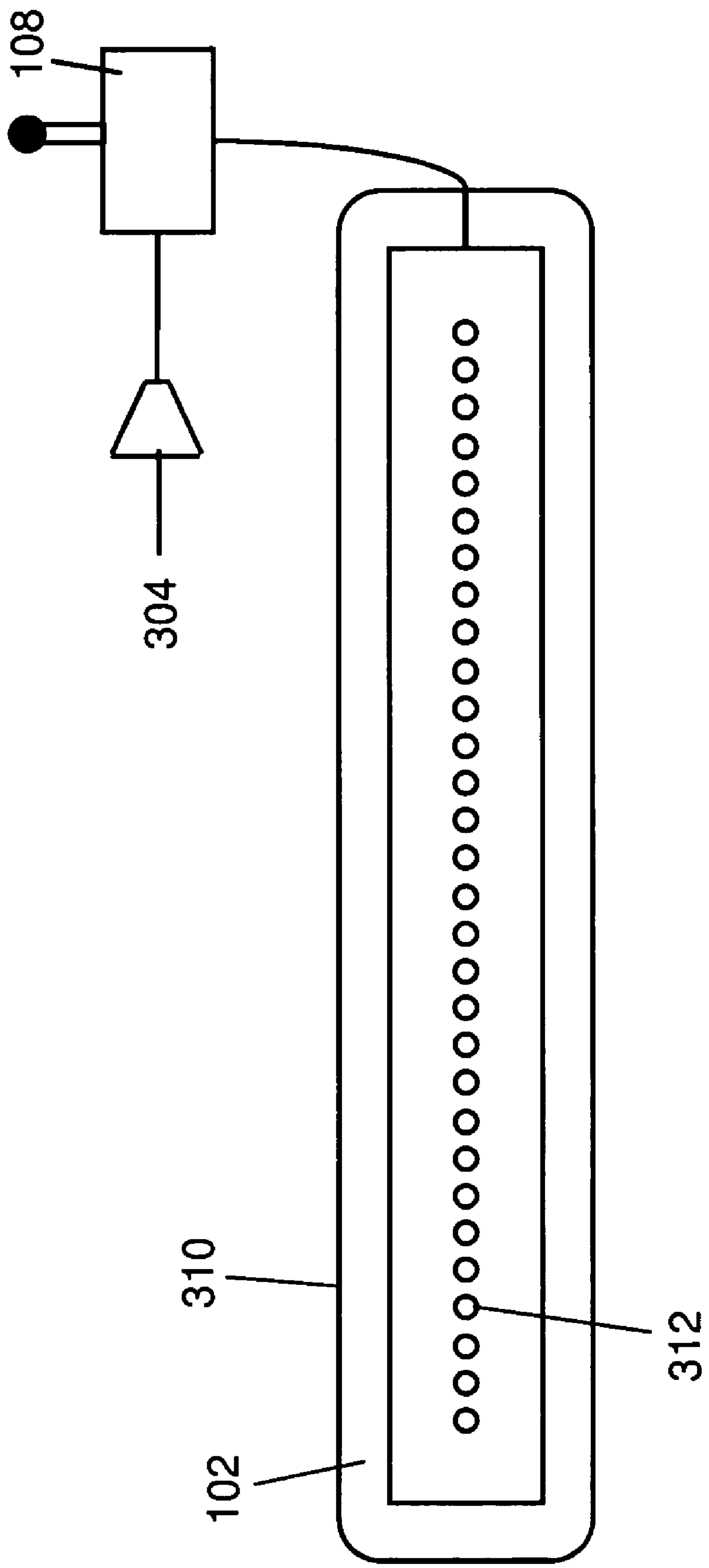

FIGS. 3A-3C illustrate embodiments of the indicator 102 in communication with the receiver 108, configured to receive the at least one wireless signal from the transmitter 100. In general, the indicator 102 comprises an indicator housing 310 and a plurality of lighting devices, for example, 300, 302, 308, 312. The lighting devices may be configured to display a single color or multiple colors and may comprise devices including, but not limited to, incandescent lights, compact fluorescent (CF) lights, electroluminescent (EL) lights, and light emitting diodes (LEDs). One or more speakers 304 may be incorporated into the indicator or in communication with the receiver 108 such that audible and/or visible signals from the indicator 102 and speakers 304 may be transmitted concurrently. In further embodiments, the indicator 102 and receiver 108 may be integrated within a single unit.

In other embodiments, the indicator 102 may comprise a line-out port 314 that allows the output of the lighting devices 300, 302, 308, 312 and/or the plurality of speakers 304 to be transmitted to one or more external devices. For example, the line-out port 314 may be configured to receive a headphone plug such that sounds from the receiver 102 are transmitted to headphones worn by the driver, allowing the driver to hear such sounds in very noisy environments.

In one embodiment, the indicator 102 may further comprise a processor (not shown) which is configured to receive the wireless signal 120 and provide instructions to the lighting devices 300, 302, 308, 312 and the one or more speakers 304 (if present). In alternative embodiments, the processor may be incorporated into the receiver 108. In further embodiments, a plurality of analog components which perform the same or substantially the same functions as the processor may be provided in lieu of the processor.

In another embodiment, when the transmitter 100 is activated, the transmitter 100 broadcasts a wireless signal 120 indicating the go condition. Upon receipt of the wireless signal 120 indicating the go condition by the receiver antenna, it may be passed to the processor. The processor identifies the received signal as indicating the go condition and instructs the lighting devices 300, 302, 308, 312 and speaker 304 to provide audible and/or visible indicators of the go condition.

In one embodiment, when the transmitter 100 is not activated, the transmitter 100 broadcasts no wireless signal 120. In another embodiment, when the transmitter 100 is not activated, the transmitter 100 broadcasts a wireless signal 120 that indicates a stop condition. The processor is configured to identify the lack of wireless signal 120, or a wireless signal 120 indicating the stop condition, and to instruct one or more indicators, such as the lighting devices 300, 302, 308, 312 and speaker 304, to provide audible and/or visible indicators accordingly. In one example, the lighting devices 300, 302, 308, 312 and speaker 304 provide audible and/or visible indicators of the stop condition.

The safety system may be further configured to default to the stop condition in the event of a cessation of the wireless signal 120 indicating the go condition. For example, the processor may instruct the indicator 102 to display audible and/or visible signals for the stop condition if greater than a selected time period passes from last receipt of the wireless signal 120 indicating the go condition. In one embodiment, the selected time period comprises about 1 second, but may comprises a shorter or longer duration depending on the embodiment. Advantageously, in this manner, the stop condition is signaled by the indictor 102 in the event of released of the button by the spotter, as well as transmitter malfunction, power loss, or obstruction of the wireless signal 120, allowing for the problem to be identified and remedied before continuing with a potentially unsafe backup operation.

In one embodiment, the lighting devices 300, 302, 308, 312 are configured to display at least one of two different colors, where the color displayed depends on whether a stop or a go condition is to be indicated by the indicator 102. As illustrated in the embodiment of FIG. 3A, a first and a second lighting device 300, 302 are provided, each designed to display a single color. For example, when the stop condition is to be displayed, a selected first color, such as red, may be shown by the second lighting device 302, in the embodiment illustrated in FIG. 3A. Similarly, when the go condition is to be displayed, a selected second color, such as green, may be shown by the first lighting device 300, in the embodiment illustrated in FIG. 3A.

In an alternative embodiment, illustrated in FIGS. 3B, 3C, the indicator 102 may comprise a third, single lighting device 308 or a plurality of lighting devices 312. The lighting devices 308, 312 may be designed to display two or more colors, such as red or green, when the processor provides instructions to display a stop or go condition, respectively.

In one embodiment, the indicator 102 may be configured to initiate a plurality of sounds for selected durations using the speaker 304, depending on whether a stop or a go condition is to be indicated by the indicator 102. For example, the indicator 102 may cause the speaker 304 to emit a relatively low tone for a long duration, for example, about 3 seconds, when indicating a stop condition and to sound a plurality of relatively high tones for short duration when indicating a go condition, for example, 3 tones, each lasting about one half second, separated by pauses of about one half second. In one embodiment, multiple tones and light sequences may be initiated by the indicator in response to a single button activation or deactivation of the transmitter. For example, multiple tones and/or light emissions may be displayed to the driver in response to the spotter depressing a button of the transmitter. As used herein, the term "emit" may refer to transmitting sound from a speaker, transmitting light from a light source, or providing any other visual, audible, or tactile signal. In other embodiments, any other tone frequency, durations, and repetitions may used to represent go and stop conditions. Table 1 illustrates embodiments of the audible and/or visible signals that may be displayed by the indicator 102 and, optionally, by the transmitter 100 to represent various states of the vehicle safety system. As noted, the transmitter emissions may be automatically initiated (such as by a processor that includes a timer function to activate and deactivate lights and/or speakers in accordance with predetermined patterns and/or at predetermined intensities/frequencies, such as those shown in table 1) in response to a single motion by the spotter, such as depressing a button or other actuator.

TABLE 1

Transmitter/Indicator audible and/or visible display as a function of safety system condition

| Condition | Transmitter Light | Transmitter Speaker |
|---|---|---|
| Go condition | Solid Green | Short, high tones (e.g., 3 tones) |
| Stop condition | Solid Red | Long, low tone (e.g., one tone) |
| Battery low | Blinking Red | Alternating low/high tones |

In further alternative embodiments, the indicator 102 may be configured to be worn by the driver. For example, the indicator 102 may be designed to be worn as a bracelet, headphones, or a hat, while providing the functions disclosed above. In this embodiment, the indicator 102 may vibrate (possibly in predetermined patterns, durations, and/or intensities) in order to communicate stop and/or go signals to the driver.

The transmitter 100 and receiver 108 may also be synched, prior to use, so as to ensure that the receiver 108 is only configured to accept instructions from a single transmitter 100. For example, the receiver may be placed into a learning mode and the transmitter 100 is activated to transmit a wireless signal representing the go condition. The wireless signal contains an identifier, such as a serial number, which uniquely identifies the originating transmitter 100. Subsequently, until reprogrammed, the receiver 108 may only respond to wireless signals containing the unique identifier.

Figure 4:
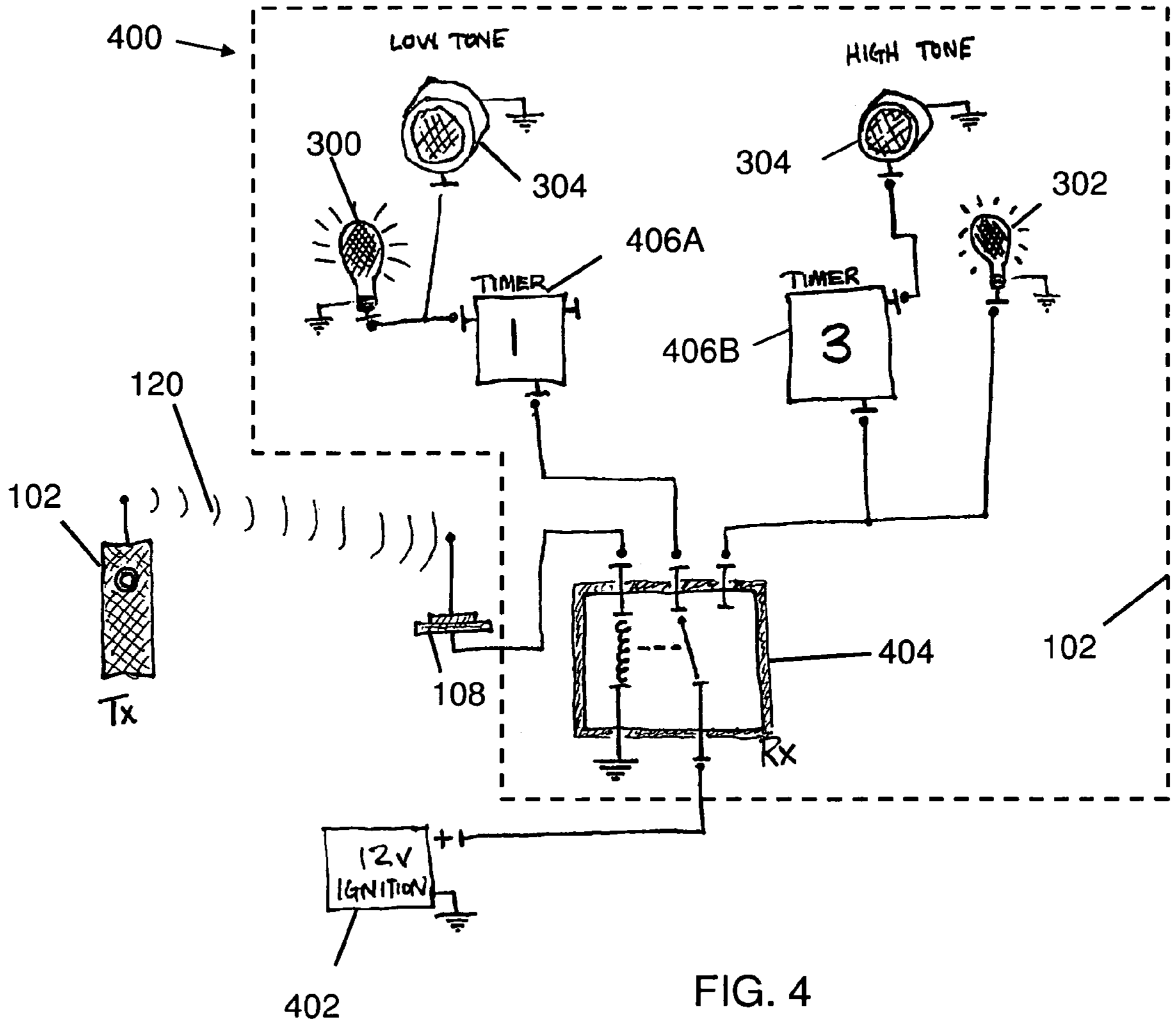
FIG. 4 is a schematic illustration of one embodiment of a circuit of the indicator of FIG. 1.

FIG. 4 illustrates one embodiment of a circuit 400 of the indicator 102. Electrical power is provided to the circuit 400 by a power supply 402. In one embodiment, the power supply 402 comprises the vehicle 104 battery. In other embodiments, the power supply 400 may comprise one or more household batteries, such as AA, C, D, or pen batteries, that are housed within the indicator 102. The power supply 400 may be configured, in one embodiment, to provide electrical power to the circuit 400 when the engine of the vehicle 104 is running. In alternative embodiments, electrical power 400 may be provided to the circuit at all times.

In the embodiment of FIG. 4, the indicator 102 comprises a switch 404 and, timers 406A, 406B. In alternative embodiments, the switch 404 and/or timers 406A, 406B are incorporated in a microprocessor, such as in a field programmable gate array (FPGA), application specific integrated circuit (ASIC), or general purpose microprocessor. The timers 406A, 406B are in communication with the plurality of speakers 304, such as a piezoelectric device. In an embodiment, each of the timers 406A, 406B is in communication with a single speaker 304. In an alternative embodiment, each timer 406A, 406B is in communication with a separate speaker 304. The switch 404 is further in communication with the lighting device 300 associated with the stop condition, and the lighting device 302, associated with the go condition. In alternative embodiments, the switch may be in communication with a single lighting device capable of providing the visible signals associated with the stop and go conditions. In other embodiments, the timer 406B may activate the lighting device 302 and or the speakers 304 for other time periods In an embodiment, when the receiver 108 receives the wireless signal 120 indicating the go condition, the switch 404 moves from a first state to a second state. Upon moving to the second state, the switch 404 routes electrical power to the timer 406B and lighting device 302 so as to indicate the go condition. For example, the timer 406B may provide signals to the speaker 304 so as to provide three, closely timed, high pitched tones. The lighting device 302 may further be lit for the duration of time that the switch 404 is in the second state.

In other embodiments, the timer 406B may activate the lighting device 302 and/or the speaker 304 for other time periods.

In this embodiment, when the receiver 108 ceases to receive the wireless signal 120, or receives a wireless signal 120 indicating the stop condition, the switch 404 moves from the second to the first state. Upon returning to the first state, the switch 404 provides electrical power to the timer 406A and the lighting device 300 so as to indicate the stop condition. For example, the timer 406A may provide signals to the speaker 304 so as to provide a continuous, low tone of selected duration. In one embodiment, upon movement of the switch from the second to the first state, the lighting device 300 may be lit for a selected duration. In an alternative embodiment, upon movement of the switch from the second to the first state, the lighting device 300 may be lit for the duration of time that the switch 404 is in the first state. In other embodiments, the timer 406A may activate the lighting device 300 and/or the speaker 304 for other time periods.

In other embodiments, the circuitry of FIG. 4 may be partially or entirely replaced by an integrated circuit, such as a FPGA, ASIC, or general purpose microprocessor. In this embodiment the timer functions and output signals, for example, may be controlled by software, firmware, and/or reconfigurable logic.

Figure 5A:
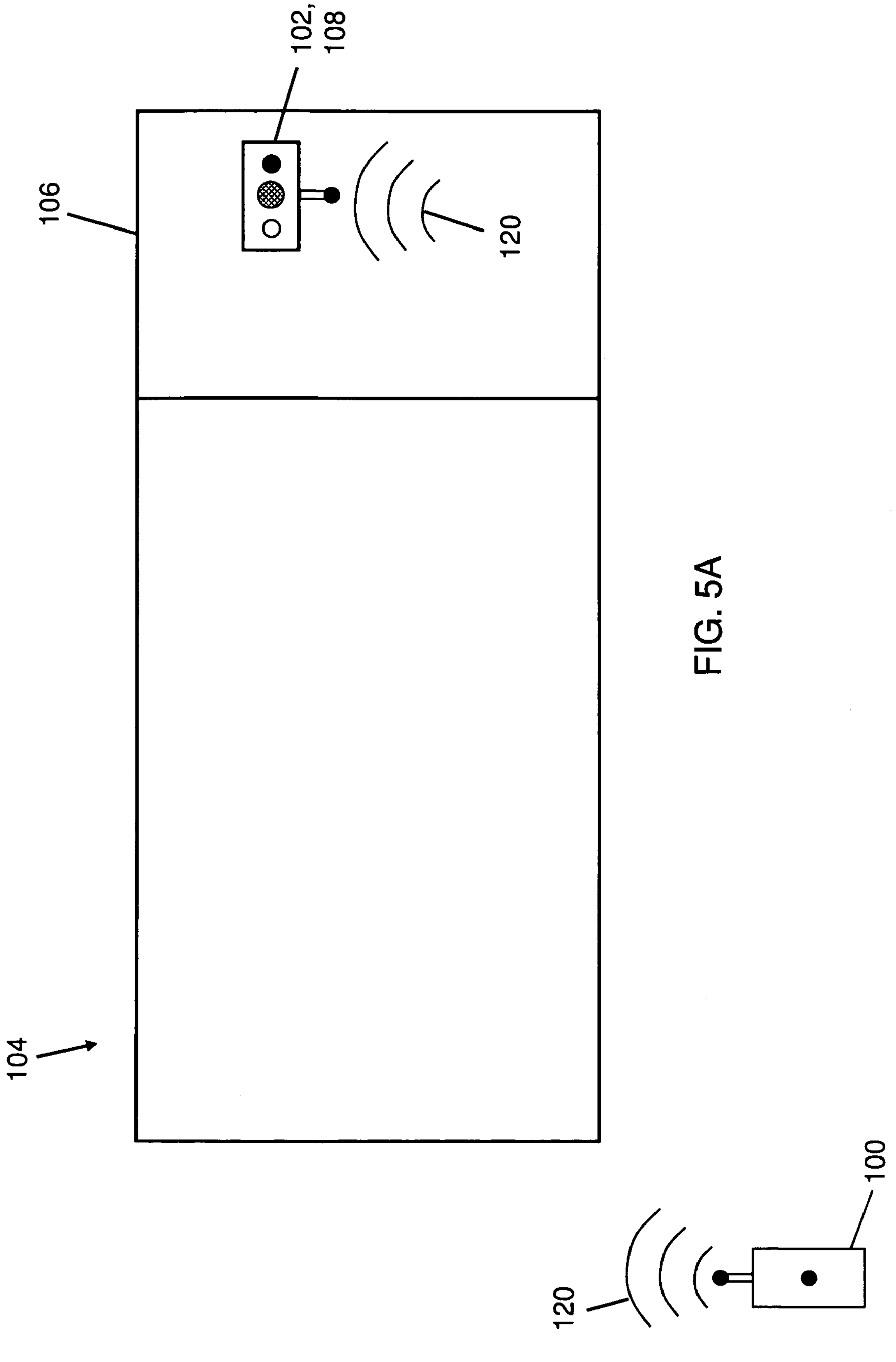
FIGS. 5A-5B are schematic views illustrating embodiments of communication mechanisms between the wireless transmitter and receiver of FIG. 1.
Figure 5B:
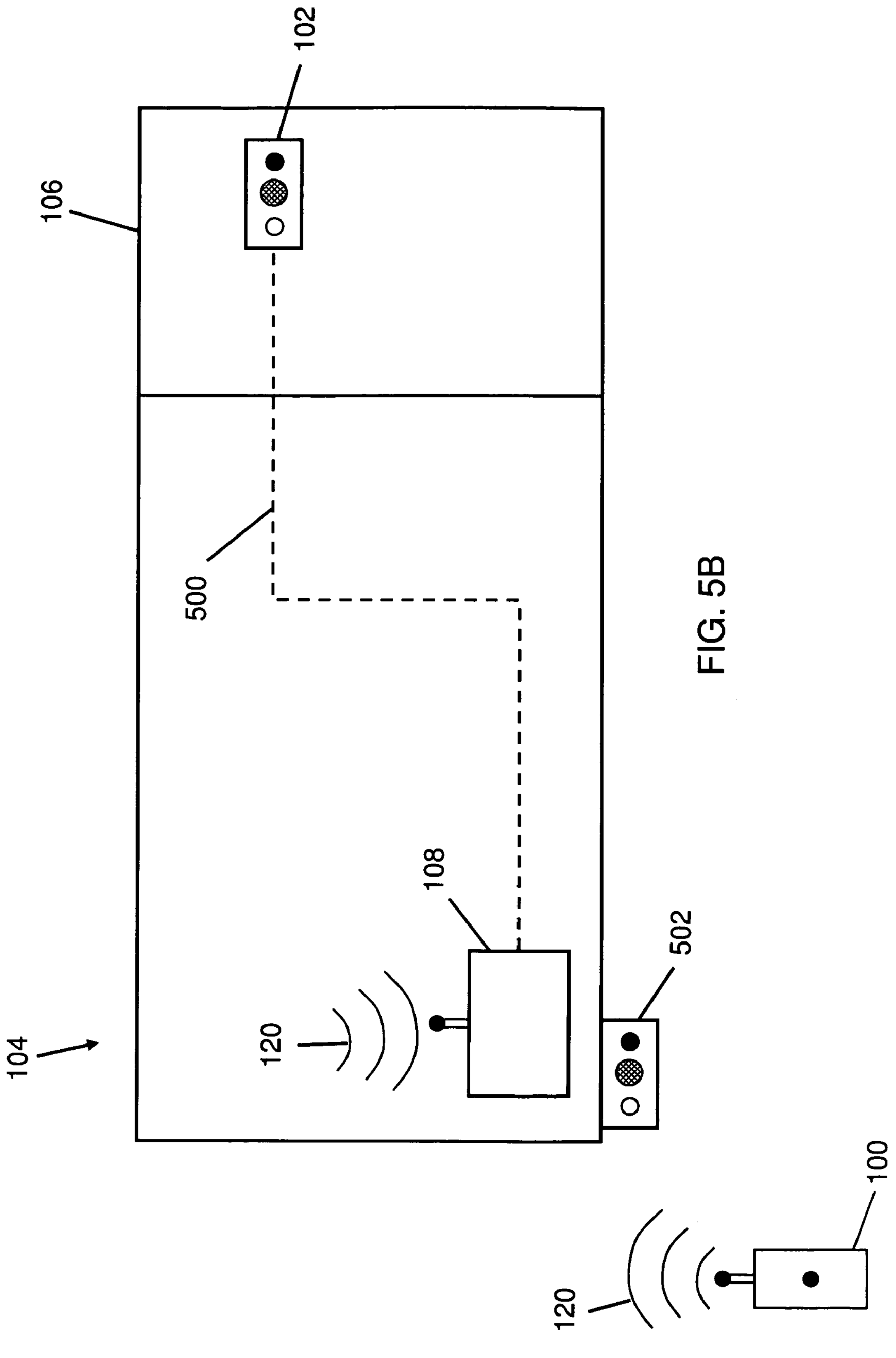

FIGS. 5A and 5B are schematic views of a vehicle 104 equipped the wireless transmitter 100, indicator 102, and receiver 108. In the embodiment of FIG. 5A, the receiver 108 is incorporated into the indicator 102 so as to receive the least one wireless signal 120 from the transmitter 100. Advantageously, such a configuration provides a self-contained receiver/indicator unit which can be moved between vehicles 104 with little difficulty, allowing the use of the system with multiple vehicles. It may be further understood, however, that in alternative embodiments, the indicator 102 and receiver 108 may comprise separate units and may be configured such that the functionalities of the indicator 102 and receiver 108 disclosed are divided in a selected manner between the separate indicator 102 and receiver 108.

In an alternative embodiment, illustrated in FIG. 5B, the indicator 102 and receiver 108 may be separate and in communication using a wired communication link 500. The receiver 108 is configured to receive the at least one wireless signal 120 from the transmitter 100. In such a configuration, the indicator 102 may also be "hardwired" into the vehicle 104, such as to the vehicle power source, providing a permanent installation of the indicator 102 within the vehicle 104. In alternative embodiments, the indicator 102 may be removably connected to the receiver 108, providing a portable indicator 102 that can be moved between vehicles possessing receivers 108.

Optionally, an exterior indicator 502 may also be mounted to the vehicle 104. Such an exterior indicator 502 may be configured to provide audible and/or visible indicators corresponding to those provided by the indicator 102, allowing those individuals external to the vehicle 104, such as the spotter and/or other bystanders, to be apprised of the condition that the indicator 102 is displaying to the driver.

In addition to the features disclosed above, embodiments of the system may comprise diagnostic systems. For example, when the system is activated by providing power to the receiver and/or indicator, the one or more speakers may provide a diagnostic tone and lights to indicate that the speakers and lighting devices are functioning properly. In one embodiment, the diagnostic tones and lights may comprise at least one of the tones and lights associated with the go and stop conditions, as described herein. In alternative embodiments, the diagnostic tone may comprise combinations of the tones and lights associated with the go and stop conditions. In further embodiments, the diagnostic tone may comprise tones and lights not associated with the go and stop conditions.

In one embodiment, the system may comprise programmed logic which detects whether one or more of the transmitter 100, indicator 102, and receiver 108 are operating properly. In one embodiment, hardware and software checks may be performed. For example, the integrity of memory devices and programs may be checked.

In another example, the system may check to ensure that the wireless signal instructing a selected condition is correct. In one embodiment, the receiver 108 may wait for receipt of a selected number of wireless signals representing the go condition before providing instructions to the indicator 102 to display the go condition.

In a further embodiment, the receiver 108 may check the data contained within received wireless signals to ensure the data is error free and fresh. For example, the data may be transmitted in packets at a selected rate and a packet counter may be used to determine whether the data is fresh.

Similarly, the system may be configured to detect whether the receiver properly receives at least one wireless signal 120 from the transmitter 100 and whether the correct audible and/or visible indicators are provided by the indicator 102 in response to reception of the at least one wireless signal 120. Advantageously, such functionality may warn users when one or more of the transmitter 100, indicator 102, and receiver 108 are not operating properly.

Figure 6:
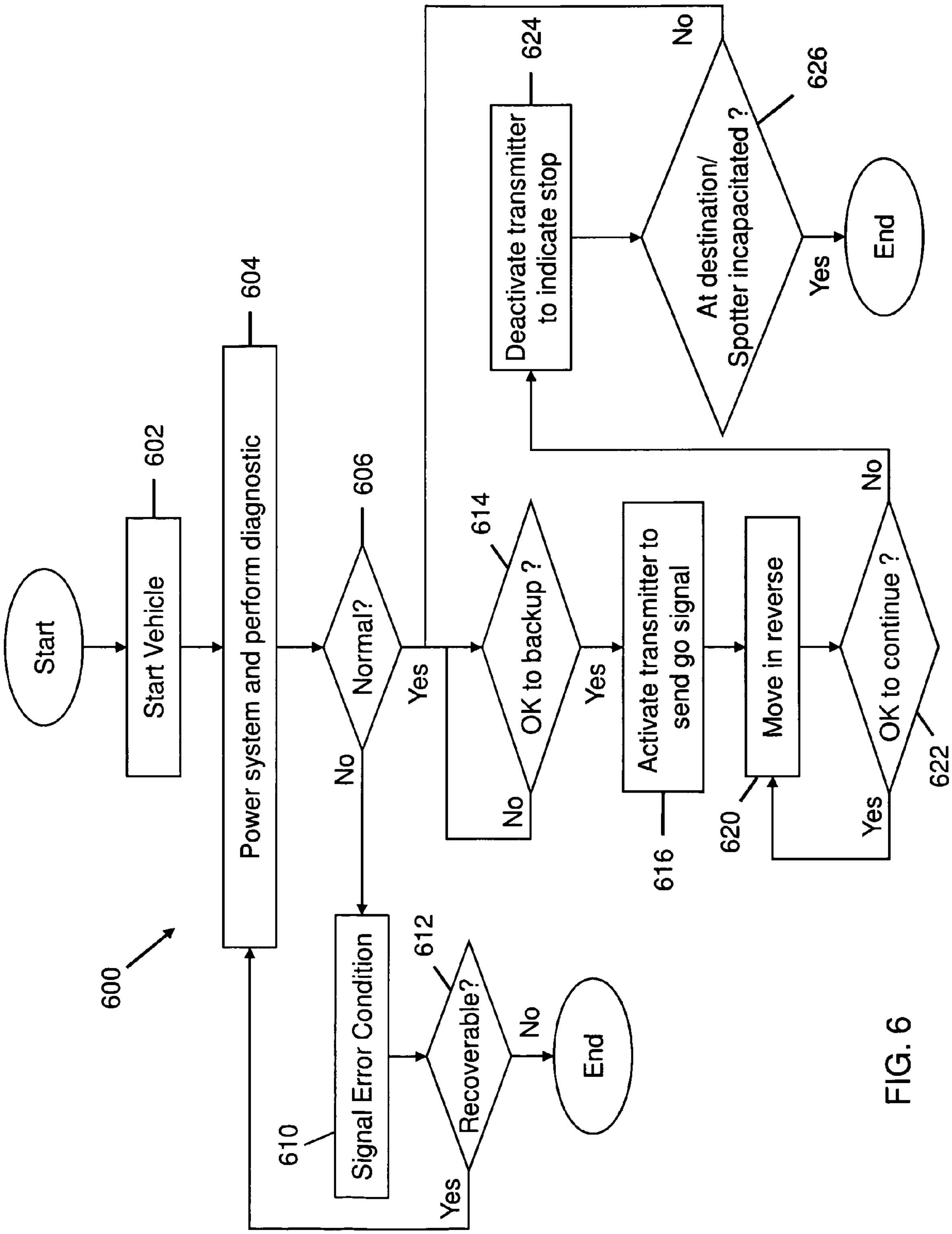
FIG. 6 is a flowchart illustrating one embodiment of a method of backing up a vehicle using the backup safety system of FIG. 1.

FIG. 6 is a flowchart illustrating one embodiment of a method 600 of backing up a vehicle using the backup safety system. Depending on the embodiment, the method of FIG. 6 may include fewer or additional steps and the steps may be performed in a different order, as necessary. The process begins with starting of the vehicle in Block 602 and providing power to the transmitter, indicator, and receiver, Block 604. In one embodiment, the system may further perform a diagnostic check, as discussed above, in response to receiving an initial power source. Depending on the embodiment, the method of FIG. 6 may include additional or fewer steps and the steps may be performed in a different order than illustrated in FIG. 6.

In Block 606, it is determined whether the transmitter and/or receiver are operating normally. If the diagnostic check is performed successfully, then a normal operating condition is detected, either by the users of the system, or by the system itself, and the method moves to Block 614.

In one embodiment, such a normal operating condition may be indicated by at least one of the transmitter and receiver using lights and or noises. For example, the indicator may provide a low, continuous tone for approximately 2-5 seconds and the lighting device associated with the stop condition may show a red light for approximately 2-5 seconds. These indicators may be provided sequentially or concurrently, as desired. Following these diagnostic tones/lights, the indicator may subsequently be quiet/dimmed until the go condition is to be indicated. In an alternative embodiment, the absence of any such lights or noises after performance of the diagnostic may be used as an indication of normal operating status.

If an error is detected, however, the method 600 moves to Block 610, where the error condition is signaled. In a further alternative embodiment, detection of an error condition may be indicated by at least one of the transmitter, indicator, and receiver. For example, the lighting devices 300, 302, 308, 312 may light up in a selected pattern. Alternatively, a selected tone and pattern may be sounded by the indicator. The method 600 then moves to Block 612.

In Block 612, it is determined whether the error is recoverable. One example of a recoverable error is the situation where any one of the transmitter, indicator, or receiver fail to receive power, such as when any of their respective power sources are drained. In the case of such a recoverable error, power may be restored and the method 600 moves to Block 604, again performing the diagnostic. If the error is not recoverable, then the method 600 ends and appropriate repairs are performed on the faulty components of the system. In one embodiment, blocks 606, 610, and 612 are not included in the diagnostic check.

In Block 614, following indication of normal operation of the system, the spotter monitors the backup path of the vehicle to determine whether it is safe (e.g. no obstructions are present in the path) and appropriate (e.g. the vehicle is not at its destination, the spotter is ready, etc) for the vehicle to backup. If it is not safe and appropriate for the vehicle to backup, then the spotter continues to watch and wait until it is safe and appropriate for the vehicle to backup. During this watching and waiting period, the transmitter is not activated, resulting in the receiver indicating the stop condition.

When it becomes safe and appropriate for the vehicle to backup, the spotter proceeds to activate the transmitter in Block 616, actuating the transmitter and sending the go signal resulting in the receiver indicating the go condition. Depending on the embodiment, the go signal may comprise various combinations of audible and/or visible cues. In one embodiment, the go signal is indicated by the receiver by initially sounding three tones and then making no sound until the stop signal is subsequently received. In one embodiment, the go signal comprises activation of a "go light" on the receiver, such as a green light emitting diode (LED), which stays active through the duration of receiving the go signal.

Having received the go signal indicated by the receiver, the driver subsequently moves the vehicle in reverse (Block 620) and the spotter continues to monitor whether it is safe and appropriate for the vehicle to backup (Block 622). As long as the spotter determines it is safe and appropriate for the vehicle to backup, the spotter continues to activate the transmitter (depressing the button) to indicate the go condition to the driver.

When there comes a time in which it is not safe and appropriate to continue the reverse course of the vehicle, the transmitter is deactivated to cause the receiver to indicate the stop condition (Block 624). The stop signal may comprise various combinations of audible and/or visible cues which are distinct from those of the go signal. In one embodiment, the stop signal is indicated by the receiver by initially sounding a long, low tone and then making no sound until the go signal is subsequently received. In one embodiment, the stop signal further comprises activation of a "stop light" on the receiver, such as a red LED. In one embodiment, the stop light may stay lit for a selected duration. In alternative embodiments, the stop light may stay lit for the duration of the stop condition; that is, until the go signal is again received.

Following deactivation of the transmitter, in Block 626, depending on the circumstances under which the transmitter was deactivated, a determination is made whether or not to continue the method 600. In one embodiment, this deactivation may be the result of a decision by the spotter to release the button/trigger on the transmitter because the vehicle's destination has been reached. Alternatively, this deactivation may be the result of the spotter becoming incapacitated and involuntarily releasing the button/trigger. In still further embodiments, this deactivation may be the result of a malfunction in the system, such as the transmitter running out of power. In these cases the method 600 then ends.

In another embodiment, this deactivation may be the result of a decision by the spotter to release the button/trigger on the transmitter because an obstruction, such as a person or another vehicle, may cross the incipient backup path. In this case, the method 600 returns to Block 614, where the spotter monitors the incipient backup path of the vehicle to determine whether it is safe and appropriate for the vehicle to backup. The method 600 subsequently proceeds as discussed above from Block 614.

Figure 7:
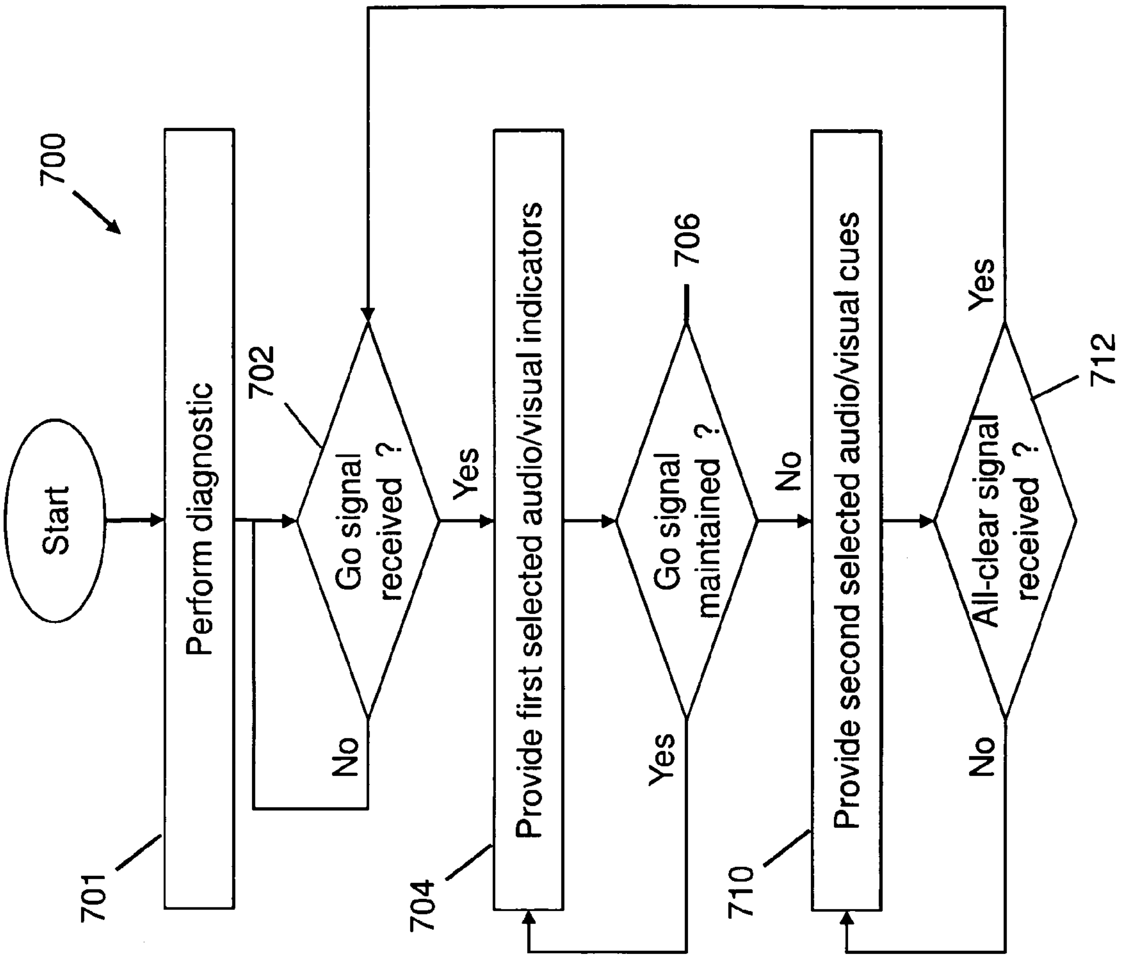
FIG. 7 is a flowchart illustrating one embodiment of a method which the receiver of FIG. 1 undergoes to provide audible and/or visible indicator to the driver of the vehicle during a backup operation.
Figure 8:
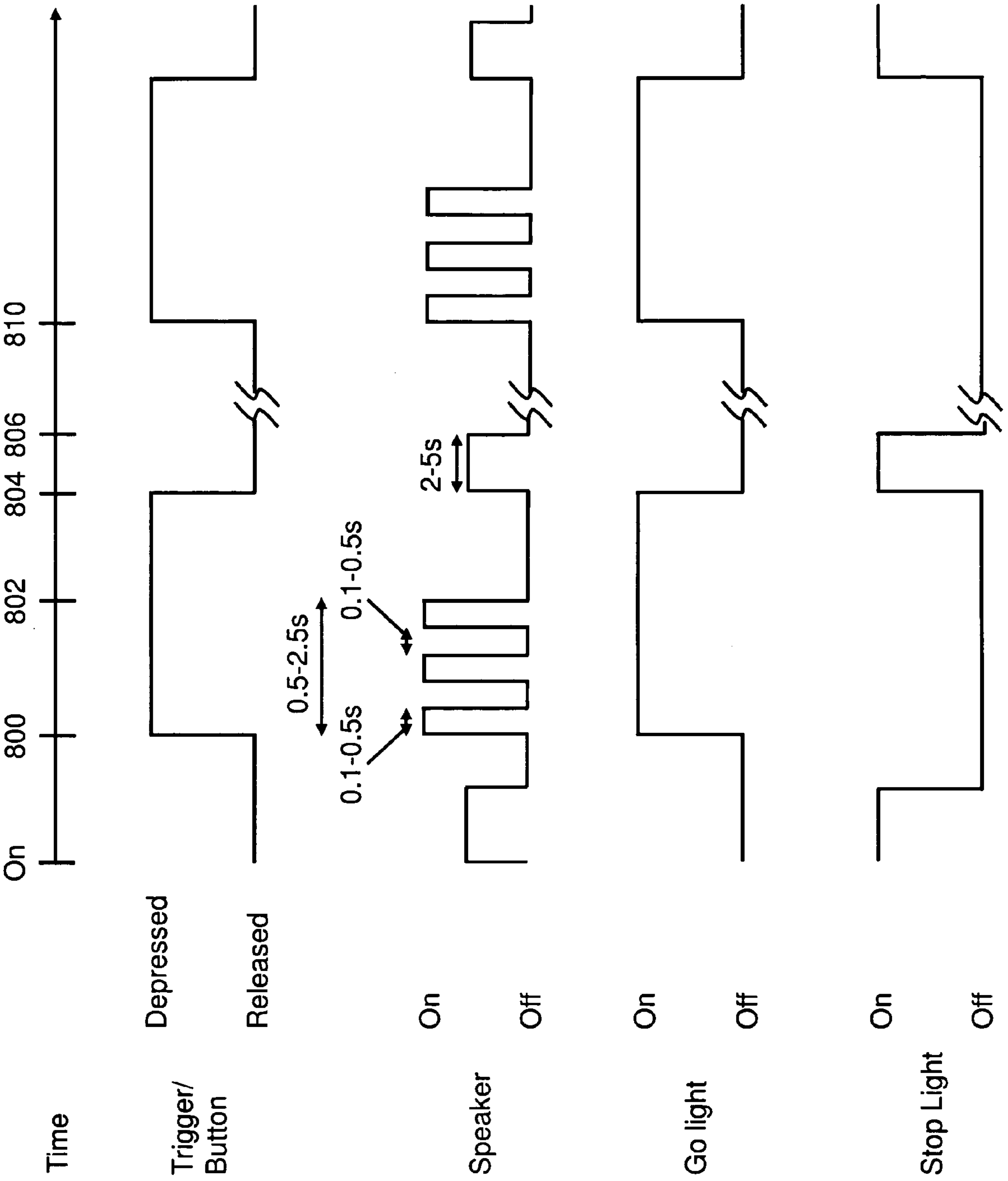
FIG. 8 is a timing diagram illustrating embodiments of the state of audible and/or visible signals provided by the receiver in response to use of the wireless transmitter.

FIG. 7 is a flowchart illustrating one embodiment of a method 700 that may be performed by a receiver/indicator in order to provide audible and/or visible indicators to the driver of the vehicle during a backup operation. FIG. 8, to be described in greater detail below in conjunction with FIG. 7, presents a timing diagram which illustrates embodiments of audible and/or visible cues that may be provided by the receive in response to activation and deactivation of the transmitter. Depending on the embodiment, the method of FIG. 7 may include fewer or additional blocks and/or the blocks may be performed in a different order than is illustrated.

In Block 701, the system performs a diagnostic when powered on, as discussed above. As illustrated in FIG. 8, in one embodiment, a low tone is sounded by the speaker for approximately 2-5 seconds. In a further embodiment, at least one of the lighting devices, for example, the stop light, is lit for approximately 2-5 seconds. These audible and/or visible indicators provide the driver with feedback that the system is properly working. In one embodiment, the method does not include block 701 and no diagnostics are performed.

In Block 702, the processor or other circuitry of the receiver and/or indicator determines whether the go signal has been received from the transmitter (in response to activation of the transmitter). If the receiver has not received the go signal, the method 700 remains in Block 702 until the receiver has received the go signal and moves to Block 704. During this period, in one embodiment, a stop indicator is provided to the driver via the indicator, such as the speaker not emitting any tones and the lights of the indicator being dimmed or off.

In Block 704, in response to receive a go signal from the transmitter controlled by the spotter, the processor instructs the audible and/or visible indicators to display a first selected set of audible and/or visible cues corresponding to the go condition. As illustrated in the timing diagram of FIG. 8, in one embodiment, when the button/trigger of the transmitter is depressed, at time 800, the speaker emits three short, high tones. Such tones may be provided for about 0.1-0.5 seconds (or any other suitable duration), separated by a pause of between about 0.1-0.5 seconds (or any other suitable duration), for a total time of between about 0.5 to 2.5 seconds, the duration between time 800 and 802. Concurrently, the indicator light or lights are provided signals from the processor causing them to emit light indicative of the received go condition.

In Block 706, the processor determines whether the go signal is maintained, e.g., in response to the spotter continuing to depress the button of the transmitter and the transmitter continuing to transmit the go signal. If the go signal is maintained, then the method 700 loops back to Block 704, where certain indicators corresponding to the go condition may be maintained. In the embodiment of FIG. 8, this time period wherein the go signal is maintained is illustrated between times 802 and 804, where the go tones are not repeated, but the go light remains activated.

If the button/trigger is released, terminating transmission of the go signal, the method 700 moves to Block 710. In Block 710, the processor instructs the audible and/or visible indicators to display a second selected set of audible and/or visible cues corresponding to the stop condition. As illustrated in the timing diagram of FIG. 8, in one embodiment, when the button/trigger of the transmitter is released, at time 804, the speaker emits a long, low tone, from time 804 to 806. Such a tone may be provided for between approximately 2-5 seconds (or any other suitable duration). Concurrently, the indicator light or lights are provided signals from the processor causing them to emit light indicative of the received stop condition.

In Block 712, the method 700 returns to Block 702, where the system waits for the go signal to be again received by the receiver. This corresponds to the time period between times 806 and 810 of FIG. 8. Subsequently, when the go signal is received, the method returns to Block 704 and proceeds as discussed above.

Although the foregoing description of the preferred embodiments of the present invention has shown, described and pointed out the fundamental novel features of the invention, it will be understood that various omissions, substitutions, and changes in the form of the details of the invention as illustrated as well the uses thereof, may be made by those skilled in the art, without departing from the scope of the present teachings. Consequently, the scope of the present teachings should not be limited to the foregoing discussion, but should be defined by the appended claims.

What is claimed is:

1. A system for signaling a driver of a vehicle to start and stop reverse motion of the vehicle, comprising:

a transmitter positioned outside of the vehicle and configured to transmit a first signal in response to activation of the transmitter, the transmitter being configured to cease transmission of the first signal upon deactivation of the transmitter;

a receiver configured to detect the first signal; and one or more indicators positioned proximate the driver of the vehicle and in communication with the receiver, wherein the one or more indicators are configured to provide a first set of human perceivable indicators in response to the receiver detecting the first signal, wherein the first set of human perceivable indicators comprises two or more tones emitted from a speaker, the two or more tones being separated by a predetermined period where another tone or no tone is emitted from the speaker, the first series of human perceivable indicators indicating to the driver that the vehicle may proceed with a reverse motion movement;

wherein the one or more indicators are further configured to provide a second set of human perceivable indicators, different than the first set, in response to the receiver ceasing to receive the first signal, the second set of human perceivable indicators indicating to the driver that the vehicle should not proceed with the reverse motion movement.

2. The system of claim 1, wherein the transmitter is dimensioned so as to allow the transmitter to be substantially carried in the hand of a human user.

3. The system of claim 2, wherein the transmitter is configured to be operated by a single hand of an operator.

4. The system of claim 3, wherein the transmitter is activated by at least one of a trigger, plunger, switch, or button.

5. The system of claim 1, wherein the receiver comprises a microprocessor.

6. The system of claim 1, wherein the first signal comprises identification information that uniquely identifies the transmitter.

7. The system of claim 1, wherein the human perceivable indicators comprise one or more of a lighting device and speaker.

8. The system of claim 1, wherein the transmitter is configured to broadcast a second signal upon deactivation of the transmitter and the indicators are further configured to provide the second set of human perceivable indicators in response to the receiver receiving the second signal.

9. The system of claim 1, wherein, after receipt of the first signal, the plurality of indicators provide the second set of human perceivable indicators after the receiver fails to receive the first signal for a selected time period.

10. A method of providing backup instructions to a driver of a vehicle, comprising:

electronically determining whether a receiver positioned on or in the vehicle receives a first signal transmitted from a transmitter positioned outside of the vehicle; and in response to receiving the first signal, providing instructions to one or more indicators that are positioned proximate a driver of the vehicle to provide a first set of signals representative of a command to backup the vehicle;

in response to not receiving the first signal, providing instructions to one or more indicators to provide a second set of signals representative of a command to not backup the vehicle.

11. The method of claim 10, wherein the one or more indicators comprises one or more of a speaker and a light.

12. The method of claim 11, wherein the speaker comprises a piezo-electric material and the light comprises one or more of a light emitting diode or electroluminescent material.

13. The method of claim 10, further comprising:

electronically determining whether receipt of the first signal by the receiver ceases for a selected time period after receipt of the first signal; and providing instructions to the indicators to provide the second set of signals if receipt of the first signal by the receiver ceases for greater than or equal to the selected time period.

14. The method of claim 10, wherein providing the first set of signals comprises at least one of activation of a light, deactivation of a light, changing a color of at least one light, relatively high tones, low tones, and combinations thereof.

15. The method of claim 10, wherein providing the second set of signals comprises at least one of activation of a light, deactivation of a light, changing a color of at least one light, relatively high tones, low tones, and combinations thereof.

16. The method of claim 10, further comprising synching the receiver to the transmitter such that the receiver is inhibited from providing the instructions unless the received first signal contains information identifying the receiver.

* * * * *